United States Patent [19]

Hogge, Jr.

[11] Patent Number: 4,587,653
[45] Date of Patent: May 6, 1986

[54] CIRCUIT FOR CONTROLLABLE GENERATION OF PSEUDOERRORS IN BIT PROCESSING

[75] Inventor: Charles R. Hogge, Jr., Richardson, Tex.

[73] Assignee: Rockwell International Corporation, El Segundo, Calif.

[21] Appl. No.: 537,909

[22] Filed: Sep. 30, 1983

[51] Int. Cl.⁴ .............................................. G06F 11/00
[52] U.S. Cl. ........................................ 371/6; 307/358
[58] Field of Search ............... 371/5, 6; 307/350, 351, 307/358; 328/115; 375/14

[56] References Cited

U.S. PATENT DOCUMENTS

| | | | |
|---|---|---|---|
| 3,214,700 | 10/1965 | Hook | 371/6 X |
| 3,638,138 | 1/1972 | Prögler et al. | 371/6 |
| 4,034,340 | 7/1977 | Sant'Agustino | 371/5 X |
| 4,305,150 | 12/1981 | Richmond et al. | 371/6 |
| 4,375,099 | 2/1983 | Waters et al. | 371/6 |

Primary Examiner—Charles E. Atkinson
Attorney, Agent, or Firm—V. Lawrence Sewell; H. Fredrick Hamann

[57] ABSTRACT

A circuit for generating pseudoerrors when the value of a received digital bit signal enters a pseudoerror region, as may be employed in the control loop of an adaptive system. The circuit includes its own feedback to control the boundaries of the pseudoerror region so that the rate of pseudoerror generation lies within a useful range.

5 Claims, 2 Drawing Figures

CIRCUIT FOR CONTROLLABLE GENERATION OF PSEUDOERRORS IN BIT PROCESSING

BACKGROUND OF THE INVENTION

This invention relates to processing of digital bits in an adaptive system which employs the generation of pseudoerrors. More particularly, the present invention relates to a circuit for ensuring that the number of pseudoerrors generated is controllable to lie within a range satisfactory for the operation of the adaptive system.

The circuit of the present invention finds particular utility in an adaptive equalizer of the type described by the present inventor in U.S. patent application Ser. No. 517,317, filed July 26, 1983, now U.S. Pat. No. 4,538,283 issued Aug. 27, 1985, and entitled "Adaptive Equalizer Suitable for Use with Fiber Optics". In that application, the present inventor describes how a digital pulse received in a transmission system and transformed to baseband can be adaptively equalized for transmission distortion by a control loop which includes processing of the received digital pulse by an overcompensated equalizer and an undercompensated equalizer. The overcompensated and undercompensated pulses are each input to an associated pseudoerror comparator and detector which generates a pseudoerror if the amplitude of the pulse lies within a selected pseudoerror region. For NRZ pulses, this region extends above and below the bit slicing level for one/zero determination. Thus, pseudoerrors are produced by pulses which are not clearly a logic one or a zero.

The term "pseudoerror" is used to emphasize that the errors are artificially produced, and that their presence does not mean that there are errors occurring in the main bit identification circuitry controlled by the adaptive loop. In the system which is the subject of the referenced patent application, the errors are artificial in two respects. First, they are generated by over- or undercompensated equalizers. Second, the designation of certain bit pulse amplitudes as constituting errors is done strictly so as to satisfy the requirements of the adaptive control loop.

The definition of that range of bit pulse amplitudes which constitute errors is the problem to which the current invention is directed. The adaptive equalization system of the referenced patent application requires that the rate of pseudoerror generation lies within certain roughly defined boundaries. If very few pseudoerrors are generated, then the adaptive mechanism will tend to flip from one extreme to the other, depending upon whether it is the overcompensated or undercompensated part of the system which is generating the pseudoerror. If too many pseudoerrors are generated, it will be difficult for the system to detect a difference between the over and undercompensated sources of pseudoerrors. It is expected that other bit pulse processing systems which can employ pseudoerror generation will benefit from having the rate of error generation be within certain boundaries.

SUMMARY OF THE INVENTION

In accordance with the present invention, there is provided a circuit which employs feedback control to ensure that pseudoerrors are generated at a rate which lies within a selected range.

The advantage provided by the present invention can be understood in terms of the system described in the referenced patent application. There, the number of pseudoerrors generated in response to an overequalized bit pulse or an underequalized one will depend on the way in which the transmission medium has distorted the pulses received by the adaptive equalizer. Accordingly, if the receiving equipment containing the adaptive equalizer is, for example, used with a short fiber optic cable, a different rate of pseudoerror generation can be expected than if it is used with a long cable. The adaptive equalizers could be adjusted in the field to obtain the necessary range of pseudoerror generation; however, it is very advantageous not to have to make such an adjustment. The circuit of the present invention, of course, automatically maintains the pseudoerror rate generation within a selected range, without the need for field adjustment.

DESCRIPTION OF PREFERRED EMBODIMENT

Figure 1:
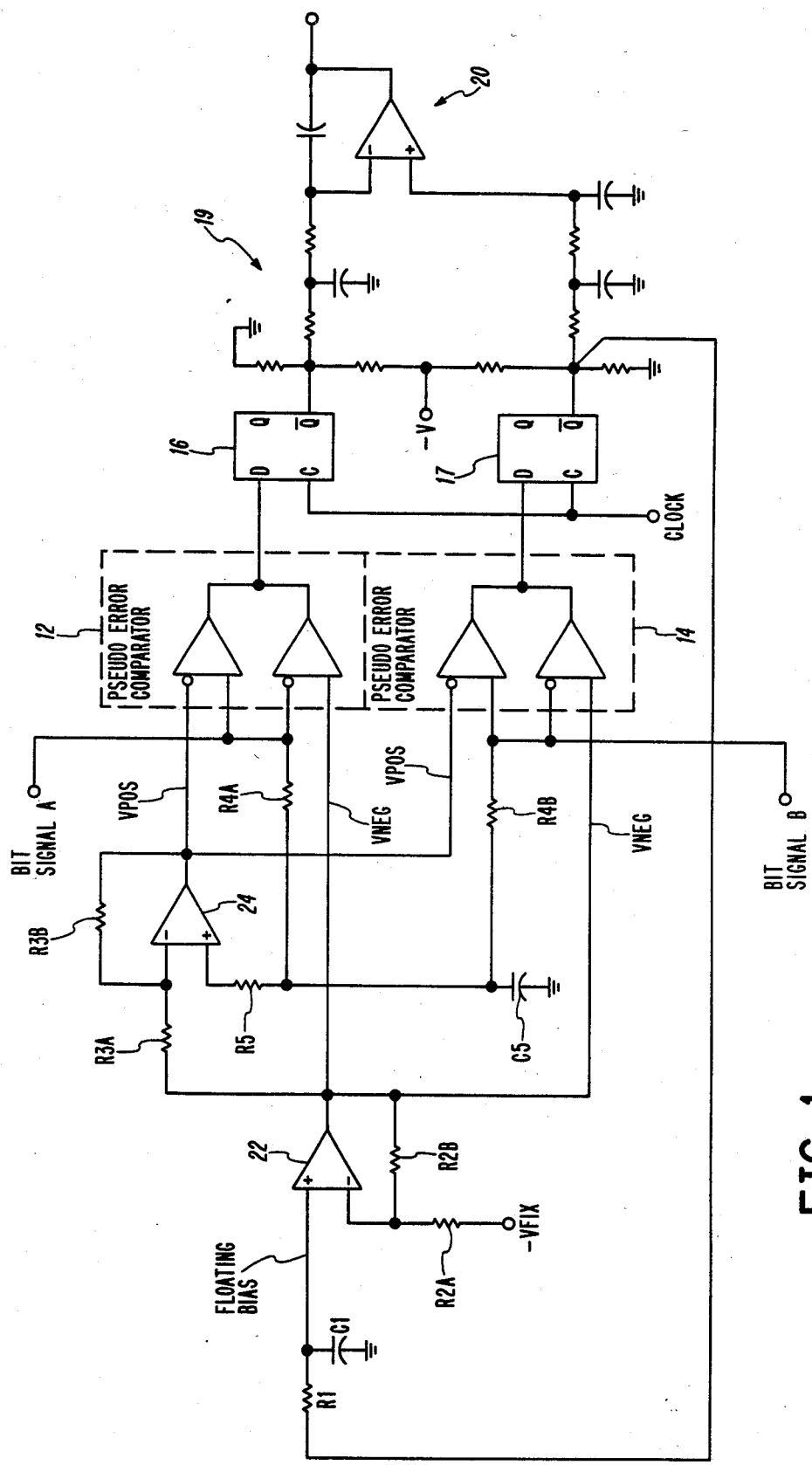
FIG. 1 is a schematic diagram of a circuit for generating pseudoerrors in accordance with the invention.
Figure 2:
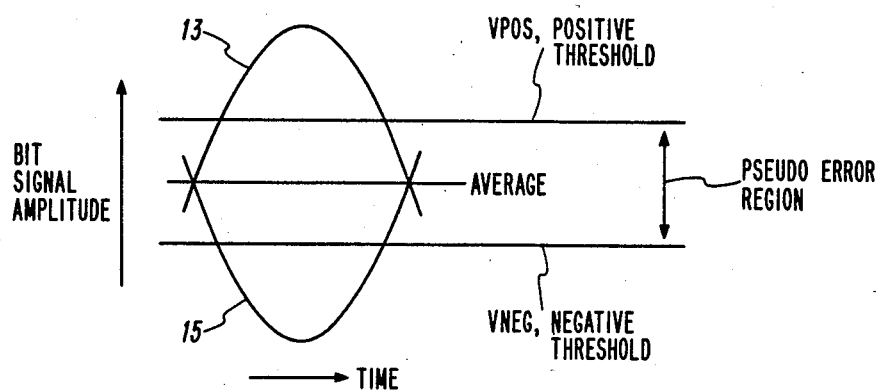
FIG. 2 is a plot of bit signal amplitude versus time, illustrating certain variables and parameters associated with the circuit of FIG. 1.

FIG. 1 illustrates a circuit for generating pseudoerrors in accordance with the invention. A pseudoerror comparator 12 compares a bit signal A with threshold value VPOS and VNEG. The relationship of these variables and parameters is illustrated in FIG. 2. FIG. 2 shows a positive peaking bit signal waveform 13 and a negative peaking waveform 15. Waveform 13 represents, for example, a probable waveform corresponding to a logic 1 bit. Waveform 15 represents a probable time course associated with an occurrence of a logic 0 bit. The average value of a signal including waveform portions 13 and 15 is indicated by a horizontal line in the plot of FIG. 2.

On either side of the average line in FIG. 2 are positive and negative threshold values, VPOS and VNEG, respectively. These bound the pseudoerror region. The threshold value VPOS is positive in the respect of being more positive than VNEG, but it may, for example, be a negative voltage.

Pseudoerror comparator 14 performs the same sort of comparison for a bit signal B, with respect to the threshold values VPOS and VNEG. The outputs of pseudoerror comparators 12 and 14 are transformed into clocked bit values of flip-flops 16 and 17, respectively. A resistor capacitor network 19 provides proper interfacing between the flip-flops and an operational amplifier circuit 20 which compares the rate of pseudoerrors detected by flip-flops 16 and 17. In the referenced patent application, the output of amplifier circuit 20 drives an equalizer to a state in which an equal rate of pseudoerrors are detected by flip-flops 16 and 17 from bit signals A and B.

The usefulness of the present invention arises as follows. As can be understood from a consideration of FIG. 2, the rate at which pseudoerrors are generated is dependent on the size of the pseudoerror region. As the region grows larger, more errors will tend to be generated. Considering the use of the circuit of FIG. 1 in a closed loop system, it can be seen that such a closed loop system cannot operate properly, if the rate of pseudoerror generation is too small. For example, in the equalizer of the referenced patent application, if there are only occasional pseudoerrors, the error signal output by the circuit of FIG. 1 will tend to be heavily influenced by whichever of flip-flops 16 and 17 has registered the most recently received pseudoerror. This is not the desired operation. The circuit of FIG. 1 is supposed to rather continually provide an output indicative of the difference in the rates of pseudoerror generation by bit signals A and B.

If the pseudoerror range is set so that a very large number of errors are generated, then resistor and capacitor circuit 19 and amplifier circuit 20 are forced to detect a small difference between relatively large numbers.

Since the number of pseudoerrors generated by the circuit of FIG. 1 is dependent on the general condition of bit signals A and B, one approach to obtaining a pseudoerror rate in a useful range is to manually adjust the VPOS and VNEG threshold values in the presence of bit signals A and B with which the circuit is supposed to operate. The disadvantage of this approach is that the adjustment must be made in the field, and may require periodic readjustment.

The approach of the present invention is to use a measure of the rate of pseudoerror generation to automatically control threshold values VPOS and VNEG. This is seen in FIG. 1, where the inverted output of flip-flop 17 is fed back to resistor R1 and capacitor C1 which serve to integrate pseudoerror bits output by the flip-flop 17. In an embodiment of the present invention designed to be used with the equalizer described in the referenced patent application and receiving data at a rate of 135 Mbps, values for R1 and C1 are 7.5 kohms and 0.01 microfarads, respectively. In this specific embodiment, flip-flops 16 and 17 have an output of $-0.8$ volts, representing a logic one, and $-1.8$ volts, representing a logic zero.

The feedback signal from the junction of resistor R1 and capacitor C1 is applied to a circuit comprised of an operational amplifier 22, resistors R2a and R2b and a fixed voltage value or bias $-VFIX$. In the specific embodiment referred to above, the values of resistors R2a and R2b are 15 kohms, and the value of the fixed bias is $-1.5$ volts. The operation of the circuit built around operational amplifier 22 is to provide at the output of that amplifier a voltage which is equal to the sum of $-VFIX$ and twice the difference between the voltage at the positive input of amplifier 22 and $-VFIX$. For example, if the voltage at the positive input of amplifier 22 were $-1.6$ volts, the difference between it and the $-1.5$ volt value of $-VFIX$ would be $-0.1$ volt. In this case, the output of amplifier 22 would be $-1.7$ volts. It is not considered very important to the operation of the specific embodiment that the difference between the positive input of amplifier 22 and $-VFIX$ is multiplied by a factor of two. A small amount of gain is desirable, but it is believed that a range of such factors will provide satisfactory operation. It is considered important that the output of amplifier 22 is equal to the fixed value $-VFIX$ plus a measure of the difference between the feedback input to amplifier 22 and $-VFIX$.

Part of the overall operation of the circuit of the invention can be understood at this point. The output of amplifier 22 is VNEG. The positive input to amplifier 22, being an integration of the output of flip-flop 17 is a measure of the rate at which indications of pseudoerrors are generated. Since the particular equalizer system for which the circuit of FIG. 1 was designed drives the pseudoerror rates at flip-flop 16 and 17 toward the same value, the output of either flip-flop serves as a good indication of the pseudoerrors generated, for the purposes of the present invention.

The voltage at the positive input of amplifier 22, sometimes referred to herein as a floating bias, will respond to the feedback operation of the circuit of FIG. 1 by stabilizing at a particular value. This value will be near $-VFIX$. The feedback operation is as follows. If the rate of errors indicated by flip-flop 17 results in a value at the positive input of amplifier 22 which is substantially more negative than the stabilized floating bias value, then VNEG will become more negative, expanding the pseudoerror region. The resulting larger number of pseudoerrors, output as logic zeros, by comparators 12 and 14, cause a greater instance of logic ones at the inverted outputs of flip-flops 16 and 17. The increased number of logic ones drive the positive input of amplifier 22 toward a less negative value. On the other hand, if the positive input of amplifier 22 becomes less negative than the stabilized floating bias value, VNEG will become less negative, contracting the pseudoerror region, reducing the number of pseudoerrors generated. This will drive the positive input of amplifier 22 more negative. As described above, the floating bias will stabilize at a value near $-VFIX$; in this sense, then, variations of the floating bias are referenced to $-VFIX$.

The positive threshold value VPOS is derived by inputting VNEG to a circuit including operational amplifier 24 and resistors R3A and R3B, connected to the negative input of amplifier 24. Connected to the positive input of operational amplifier 24 is a composite average value of the bit signals A and B. Bit signals A and B are connected through resistors R4A and R4B, respectively, to the circuit point between a resistor R5 and capacitor C5. This latter resistor and capacitor serve to integrate the bit signals to derive the dc average of the combined signals. In the specific embodiment referred to, resistors R3A and R3B are 15 kohms, R4A and R4B are 1 kohms, resistor R5 is 7.5 kohms and capacitor C5 is 0.1 microfarads. Operational amplifier 24 is a low speed operational amplifier, as contrasted with the amplifiers in comparators 12 and 14, which are high speed operational amplifiers.

In the specific embodiment mentioned above, the average value of bit signals A and B is about $-1.3$ volts. This appears at the positive input of operations amplifier 24. The circuit including amplifier 24 and resistors R3A and R3B operates in the same way as the circuit built around operational amplifier 22. Assuming by way of example that the output of amplifier 22 applied to resistor R3A is $-1.6$ volts, while the voltage at the positive input of amplifier 24 is $-1.3$ volts as described above, then the output of amplifier 24 would be $-1.0$. This is then the positive threshold value VPOS.

It should be noted that the effect of the circuit including amplifier 24 is to provide a VPOS ($-1.0$ volts) which is separated from the average value of the bit signals A and B ($-1.3$ volts) by the same absolute value (0.3 volts) as the negative threshold value ($-1.6$ volts) is separated from the $-1.3$ volts. It will be apparent to those skilled in the art that while the use of the circuit including amplifier 24 to generate VPOS has advantages, that other configurations are possible for generating VPOS, including a separate feedback loop responding to the rate of pseudoerror generation. In the feedback operation of the circuit, VPOS is controlled along with VNEG to expand or contract the pseudoerror region in response to the positive input of amplifier 22.

In the design of a circuit of the kind shown in FIG. 1, a starting point is a decision as to the approximate range of pseudoerror generation that is considered desirable. Given the −0.8 volts and −1.8 volts output levels of flip-flop 17, a 50% pseudoerror rate, integrated by resistor R1 and capacitor C1, would be expected to produce a voltage at the positive input of amplifier 22 of about 1.3 volts, midway between −0.8 volts and −1.8 volts. A value of −1.8 volts at this input would indicate no pseudoerrors being generated. Therefore, the −1.5 volt value for −VFIX represents an attempt to establish the pseudoerror rate near a value intermediate between 0 and 50%. The floating bias value about which the circuit stabilizes will vary by a small amount from −VFIX, depending upon the characteristics of bit signals A and B. This is unimportant, however, since the goal of the circuit is simply to establish the pseudoerror rate within an acceptable operating range.

In the preferred embodiment described in connection with FIG. 1, pseudoerror threshold values are automatically adjusted whenever a floating bias increases or decreases with respect to a stabilized value. This tends to hold the pseudoerror generation rate within a very narrow range. If it is considered desirable to allow the pseudoerror rate to vary over a wider range, then the threshold values VPOS and VNEG can be designed to be automatically adjusted, only when the floating bias leaves the range of permitted values and enters a range of values which are considered high or a range of values which are considered low. In the circuit of FIG. 1, floating bias values above the stabilized value are high and those below it are low.

The circuit of FIG. 1, which responds to two bit signals, has been described in order to relate the present invention to a previously disclosed system, that of the referenced patent application. It will be abundantly clear to those skilled in the art that the invention may be practiced responding to one bit signal, for example signal B, eliminating pseudoerror comparator 12 and flip-flop 16.

I claim:

1. A circuit for generating pseudoerrors, comprising:
    means for comparing a bit signal with a pair of threshold values to generate an indication of a pseudoerror whenever the value of the bit signal is within an error region defined by said pair of threshold values;
    means for providing a measure of the rate at which indications of pseudoerrors are generated by said comparing means;
    first threshold means, referenced to a selected fixed value, for generating a first one of said threshold values so that when said measure of the rate at which pseudoerror indications are generated increases, as referenced to said fixed value, said first threshold value changes so as to contract said error region, and if said measure of the rate of pseudoerror indications decreases, as referenced to said fixed value, said first threshold value changes to expand said error region; and
    second threshold means for generating a second one of said threshold values so that when the measure of the rate of pseudoerror indications increases, as referenced to said fixed value, said second threshold value changes to contract said error region, and if said measure of the rate of pseudoerror indications decreases, as referenced to said fixed value, said second threshold value changes to expand said error region.

2. The circuit of claim 1, wherein said first threshold value changes about a first level which is related to said selected fixed value.

3. The circuit of claim 1, wherein said second threshold means includes means for deriving an average value associated with the bit signal and causing said second threshold value to be separated from said average value by approximately the same absolute value as said first threshold value is separated therefrom.

4. A circuit for generating pseudoerrors, comprising:
    means for comparing a bit signal with a pair of threshold values to generate an indication of a pseudoerror whenever the value of the bit signal is within an error region defined by said pair of threshold values;
    means for providing a floating bias equal to an integration with a selected time constant of said indications of pseudoerrors;
    first threshold means, referenced to a selected fixed bias, for generating a first one of said threshold values, equal to the sum of said fixed bias and an amount proportional to the difference between said floating bias and said fixed bias, so that when the detected rate of pseudoerror indications increases, as measured by the difference between said floating bias and said fixed bias, said first threshold value is adjusted by said first threshold means to contract said error region, and if said rate of pseudoerror indications decreases, said first threshold value is adjusted to expand said error region; and
    second threshold means for deriving an average value associated with said bit signal and generating a second one of said threshold values separated from said average value by approximately the same absolute value as said first threshold value is separated therefrom.

5. A circuit for generating pseudoerrors, comprising:
    first means for comparing a first bit signal with a pair of threshold values to generate an indication of a pseudoerror whenever the value of the first bit signal is within an error region defined by said pair of threshold values;
    second means for comparing a second bit signal with said pair of threshold values to generate an indication of a pseudoerror whenever the value of the second bit signal is substantially within said error region;
    means, responsive to at least one of said first and second means, for providing a measure of the rate at which indications of pseudoerrors are generated;
    first threshold means, referenced to a selected fixed value, for generating a first one of said threshold values so that when said measure of the rate at which pseudoerror indications are generated increases, as referenced to said fixed value, said first threshold value changes so as to contract said error region, and if said measure of the rate of pseudoerror indications decreases, as referenced to said fixed value, said first threshold value changes to expand said error region; and
    second threshold means for deriving a composite average value of said first and second bit signals and generating a second one of said threshold values separated from said average value by approximately the same absolute value as said first threshold value is separated therefrom.

* * * * *